United States Patent
Cho et al.

(10) Patent No.: US 6,877,860 B2
(45) Date of Patent: Apr. 12, 2005

(54) SCROLLING PROJECTION SYSTEM AND METHOD

(75) Inventors: Kun-ho Cho, Gyeonggi-do (KR); Dae-sik Kim, Gyeonggi-do (KR); Sungha Kim, Seoul (KR); HeeJoong Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/644,933

(22) Filed: Aug. 21, 2003

(65) Prior Publication Data

US 2004/0061836 A1 Apr. 1, 2004

(30) Foreign Application Priority Data

Aug. 24, 2002 (KR) .................. 10-2002-0050306

(51) Int. Cl.[7] .......................... G03B 21/00; G03B 21/14
(52) U.S. Cl. ........................ 353/31; 353/33; 353/101; 353/84
(58) Field of Search ................ 353/30–34, 81, 353/84, 100, 101, 122, 37, 94; 359/891, 892, 694–696, 811–814; 348/759, 771, 761, 762, 766, 742, 743; 349/5, 7–9

(56) References Cited

U.S. PATENT DOCUMENTS 5,969,832 A * 10/1999 Nakanishi et al. ............ 359/15
6,219,110 B1 * 4/2001 Ishikawa et al. ............. 348/759
6,547,398 B2 * 4/2003 Cho et al. ..................... 353/31
6,619,802 B2 * 9/2003 Janssen et al. ................ 353/31
2003/0007134 A1 * 1/2003 Maximus ...................... 353/31
2004/0046946 A1 * 3/2004 Kim ........................... 353/101
2004/0105077 A1 * 6/2004 Kim et al. ..................... 353/31

OTHER PUBLICATIONS

U.S. Appl. No. 10/644,883, filed Aug. 21, 2003, Kim et al.

* cited by examiner

*Primary Examiner*—Judy Nguyen
*Assistant Examiner*—Andrew Sever
(74) *Attorney, Agent, or Firm*—Staas & Halsey LLP.

(57) ABSTRACT

A highly efficient projection system, including a light source, a scrolling unit, a color separation hologram, a light valve, and a projection lens unit. The scrolling unit includes spirally arranged cylinder lens cells to scroll/cycle incident beams while rotating. The color separation hologram separates a beam radiated from the light source into beams with different wavelengths. The light valve forms a color image by turning on or off pixels according to an input image signal. The projection lens unit magnifies the image formed by the light valve and projects the magnified image toward a screen. In this projection system three color beams from the light source are scrolled simultaneously to produce a picture, resulting in a highly light efficient projection system.

29 Claims, 6 Drawing Sheets

SCROLLING PROJECTION SYSTEM AND METHOD

CROSS-REFERENCE TO RELATED APPLICATIONS

This application claims the priority of Korean Patent Application No. 2002-50306, filed on Aug. 24, 2002, in the Korean Intellectual Property Office, the disclosure of which is incorporated herein in its entirety by reference.

BACKGROUND OF THE INVENTION

1. Field of the Invention

The present invention relates to a compact projection system increasing optical efficiency by using a hologram and a scrolling unit.

2. Description of the Related Art

As illustrated in FIG. 1, a conventional projection system includes a light source 100, first and second relay lenses 102 and 110, a color wheel 105, a fly-eye lens 107, a light valve 112, and a projection lens unit 115. The first relay lens 102 focuses a beam emitted from the light source 100 onto the color wheel 105, which separates the incident beam into three color beams of light, namely, R, G, and B beams. The fly-eye lens 107 makes the R, G, and B beams transmitted by the color wheel 105 uniform. The second relay lens 110 then focuses the R, G, and B beams transmitted by the fly-eye lens 107 onto the light valve 112, which forms a picture using the R, G, and B beams sequentially emitted from the color wheel 105. The projection lens unit 115 advances the formed picture toward a screen 118.

In the conventional projection system, color images are obtained by rotating the color wheel 105 at a high speed using a driving motor (not shown) and sequentially radiating R, G, and B beams to the light valve 112. The color wheel 105 is equally divided into three color filters, namely, R, G, and B filters. Accordingly, when the color wheel 105 rotates, in accordance with the response speed of the light valve 112, the three color filters are sequentially used to form the R, G, and B beams. This operation results in a light loss corresponding to ⅔ of an incident beam. Light loss is also generated by a predetermined gap formed between two adjacent color filters, typically to achieve better color images.

In addition, because the color wheel 105 rotates at a high speed, noise is also generated. Further, the mechanical rotation of the color wheel 105 causes the motion of the color wheel 105 to be unstable. The driving motor to rotate the color wheel 105 also contributes to an increasing of the size of the color wheel 105. Since the color wheel 105 cannot accelerate over a certain speed, due to a mechanical limit of the driving motor, color breakup also occurs. Furthermore, projection system manufacturing costs also increase because of the color wheel being very expensive.

SUMMARY OF THE INVENTION

The present invention provides a projection system which performs color separation using a hologram without using a color wheel and performs scrolling using a rotating scrolling unit to produce a color image, so that the size of the projection system and the light loss are minimized.

Additional aspects and advantages of the invention will be set forth in part in the description which follows and, in part, will be obvious from the description, or may be learned by practice of the invention.

According to an aspect of the present invention, there is provided a projection system, including a light source, a scrolling unit, including spirally arranged cylinder lens cells, to scroll an incident beam while rotating, a color separation hologram separating a beam radiated from the light source into beams with different wavelengths, a light valve forming a color image by turning on or off pixels according to an input image signal and color separated scrolling light beams, and a projection lens unit magnifying the image formed by the light valve and projecting the magnified image toward a screen.

The projection system may further include first and second fly-eye lenses between the light source and the light valve. In addition, projection system may further include a relay lens between the second fly-eye lens and the light valve to focus color beams transmitted by the second fly-eye lens on respective color areas of the light valve. The projection system may include a first cylinder lens before the scrolling unit and a second cylinder lens paired with the first cylinder lens after the scrolling unit to control a width of a beam incident upon the scrolling unit. Further, the projection system may also include a light path correction hologram to correct changes of light paths of color beams transmitted by the color separation hologram. Lastly, the scrolling unit may be a disc including the spirally arranged cylinder lens cells.

According to another aspect of the present invention, there is provided a projection system, including a light source, a scrolling unit including spirally arranged cylinder lens cells, a light valve forming a color image based on color separated scrolling light beams that are based at least on light beams from the light source scrolled by the scrolling unit, and a projection unit to project the image.

According to another aspect of the present invention, there is provided a projection system including a light source, a scrolling unit to simultaneously scroll at least two light beams from the light source, a light valve forming a color image based on color separated scrolling light beams that is based at least on one of the two scrolled light beams, and a projection unit to project the image.

According to another aspect of the present invention, there is provided a image generation method including simultaneously scrolling at least two light beams incident from a light source, and generating a color image based on color separated scrolling light beams that are based at least on one of the two scrolled light beams.

According to another aspect of the present invention, there is provided a projection method including a projection method, including simultaneously scrolling at least two light beams incident from a light source, generating a color image based on color separated scrolling light beams that are based at least on one of the two scrolled light beams, and projecting the generated color image.

BRIEF DESCRIPTION OF THE DRAWINGS

These and/or other aspects and advantages of the present invention will become more apparent and more readily appreciated from the following description of the preferred embodiments, taken in conjunction with the accompanying drawings in which.

DETAILED DESCRIPTION OF THE INVENTION

Figure 1:
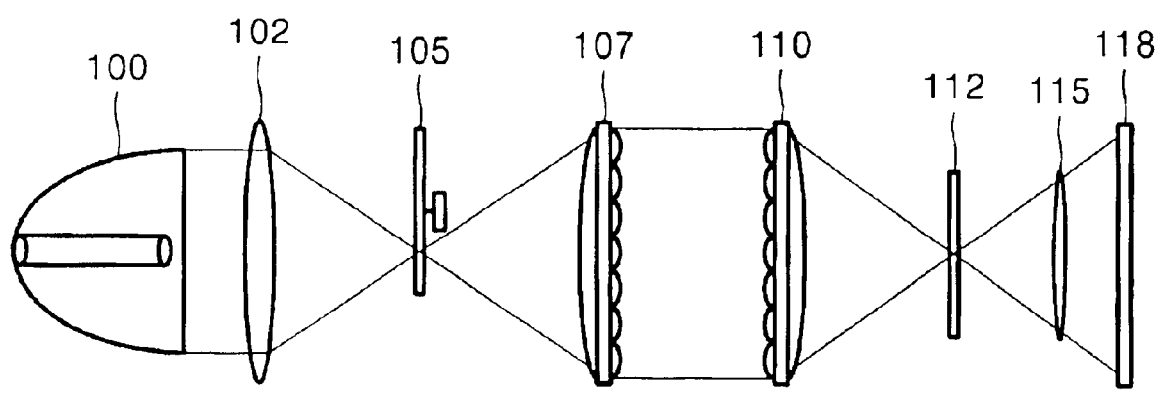
FIG. 1 illustrates a conventional projection system.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
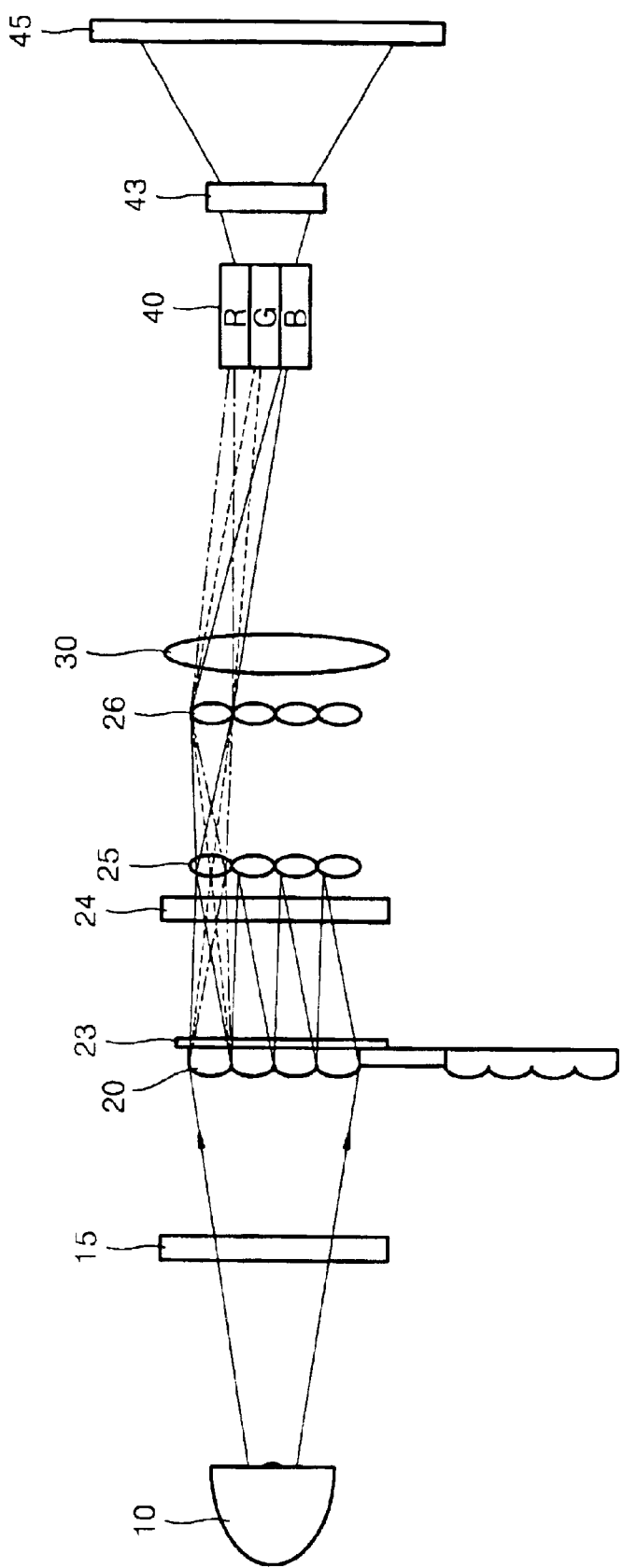
FIG. 2 illustrates a highly efficient projection system, according to an embodiment of the present invention.

FIG. 2 illustrates a projection system according to an embodiment of the present invention. As illustrated in FIG. 2, a scrolling unit 20 scrolls a light beam radiated from a light source 10 for ultimate projection on a screen 45. The light beam radiated from the light source 10 is scrolled by the scrolling unit 20 and then separated into three light beams, namely, R, G, and B beams, by a color separation hologram 23. The color separation hologram 23 can be installed ahead of or behind the scrolling unit 20.

The R, G, and B beams transmitted by the scrolling unit 20 and the color separation hologram 23 are ultimately incident upon respective color areas of a light valve 40, which can form a color image by turning on or off its pixels according to an image signal provided to the light valve 40. The color image can be magnified by the projection lens unit 43 and projected onto the screen 45.

First and second fly-eye lenses 25 and 26 and a relay lens 30 are installed on a light path between the scrolling unit 20 and the light valve 40.

Figure 3A:
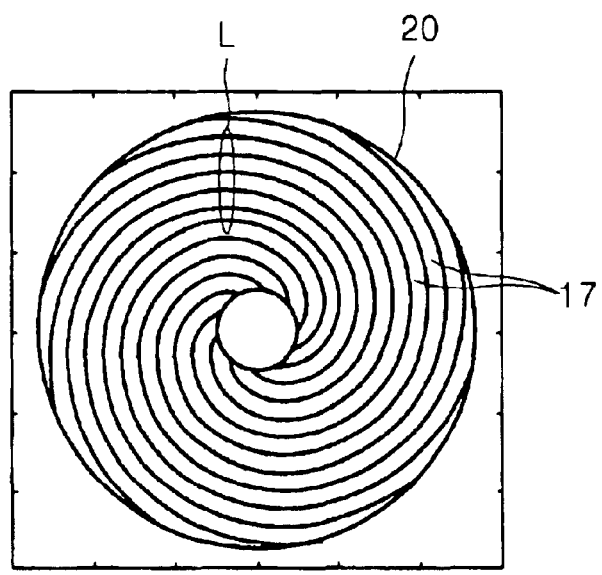
FIG. 3A illustrates a scrolling unit used in a highly efficient projection system, according to an embodiment of the present invention.

As illustrated in FIG. 3A, the scrolling unit 20 is rotatable and formed by spirally arranging cylinder lens cells 17. The scrolling unit 20 may be disc shaped and comprise at least one cylinder lens cell 17 to achieve color scrolling. As described herein, color scrolling can be considered similar to the conventional sequential forming of singular R, G, and B beams with a color wheel in that color beams of light sequentially change, but the scrolling herein is actually quite different in that the generation of different color beams the by scrolling unit 20 is performed simultaneously compared to the conventional color wheel system which performed differing color beam generation sequentially. The scrolling of color beams here is evidenced in the generated light beams actually cycling in a rectilinear manner, e.g., up or down.

As will be described in more detail below, if a particular light beam from light source 10 always radiates toward a particular fixed area on the surface of the scrolling unit 10, then as the scrolling unit 10 rotates, that light beam will continue to radiate on the same particular fixed area of scrolling unit 10 but the corresponding lens cell 17 transitions past this particular fixed area as the scrolling unit rotates, resulting in a rectilinear scrolling or cycling of the resultant light beam. Considering a uniform light distribution, it is preferable that the scrolling unit 20 is comprised of at least three cylinder lens cells. In FIG. 3A, the reference character L represents the incident light beams to scrolling unit 20 which ultimately result the R, G, and B beams. When the scrolling unit 20 rotates at a uniform speed, the cylinder lens cells 17, in effect, act as if a light penetrating area of the cylinder lens cells 17 was actually moved rectilinearly. As described above, the rotation of the cylinder lens cells 17 results in a light beam being output with rectilinear motion, thereby achieving scrolling.

Figure 3B:
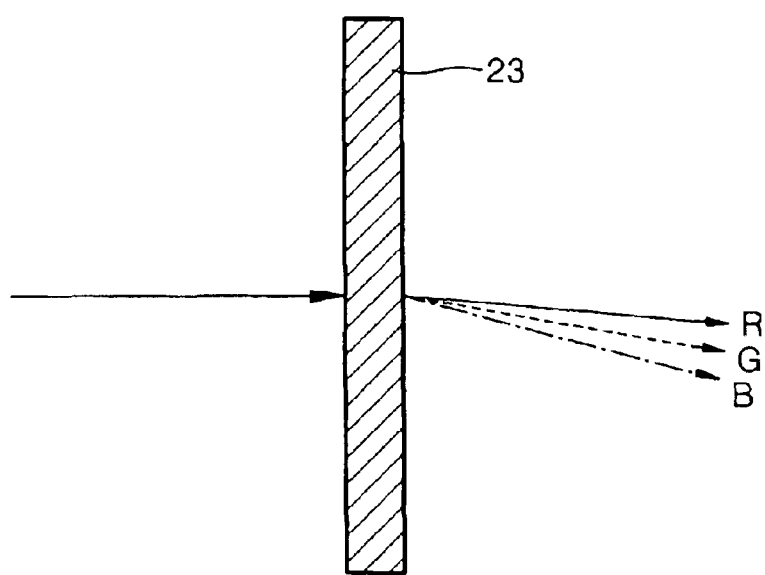
FIG. 3B illustrates a hologram used in a highly efficient projection system, according to an embodiment of the present invention.

As shown in FIG. 3B, the color separation hologram 23 separates an incident white beam according to a wavelength. Separated wavelength ranges may vary depending on the pattern of the color separation hologram 23. Although FIG. 3 shows a case in which a white beam is separated into three beams, namely, R, G, and B beams, the white beam can be separated into more than three color beams. As described above, the color separation hologram 23 can be installed ahead of or behind the scrolling unit 20.

Figure 4:
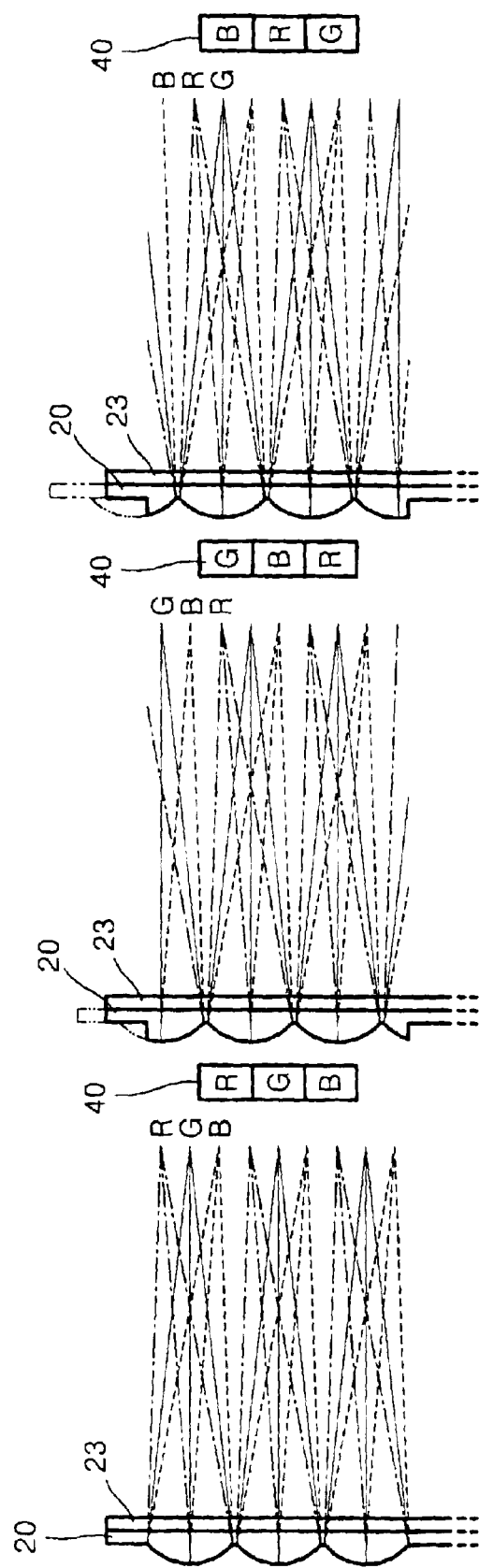
FIG. 4 illustrates a color scrolling operation performed with a rotation of a scrolling unit used in a highly efficient projection system, according to an embodiment of the present invention.

In the scrolling operation of the scrolling unit 20, referring to FIG. 4, a beam radiated from the light source 10 is incident upon the scrolling unit 20 and then separated into three beams, namely, R, G, and B beams, by the color separation hologram 23. The R, G, and B beams transmitted by the color separation hologram 23 are then focused onto different areas on the light valve 40. Therefore, light incident upon each of the lens cells 17 eventually results in the R, G, and B beams. The R, G, and B beams are focused on three respective areas of the light valve 40 via the first and second fly-eye lenses 25 and 26 and the relay lens 30, thereby forming color bars. This will be described later. Hereinafter, color scrolling performed by the scrolling unit 20 and the color separation hologram 23 will be described.

When the scrolling unit 20 rotates at a constant speed, from the point of view of the cross-section of the light-penetrating area, it appears that the cylinder lens cells 17 of the scrolling unit 20 moves up and down at a uniform speed. Hence, the positions of the beams transmitted by the scrolling unit effectively look to be continuously changing or cycling. As described above, as the area of the scrolling unit 20, through which the incident light passes, changes, the locations on which the R, G, and B beams separated by the color separation hologram 23 are focused also sequentially change or cycle.

As shown in FIG. 4, first, light passes through the scrolling unit 20, the first and second fly-eye lenses 25 and 26, and the relay lens 30, resulting in the formation of color bars on the light valve 40 in an R, G, and B order. Next, as the scrolling unit 20 rotates, the lens surface of the scrolling unit 20 gradually moves upward, i.e., in a radial direction away from the disc center of scrolling unit 20, while the light passes through the scrolling unit 20, thereby eventually resulting in color bars in a G, B, and R order. As the scrolling unit 20 further rotates, color bars are generated in a B, R, and G order. In other words, the locations of lenses upon which beams are incident change according to the rotation of the scrolling unit 20, and the rotation of the scrolling unit 20 results in a rectilinear motion of a cylinder lens cell array at the cross-section of the scrolling unit 20 so that locations of the differing color bars cycle. Hence, color scrolling is achieved. While such color scrolling or cycling is repeated, individual pixels of the light valve 40 are switched on or off, thereby producing a color image.

Thus, a projection system according to embodiments of the present invention can entirely use an incident beam even in a single-panel structure, thereby greatly increasing light efficiency compared to conventional single-panel projection systems that use a color wheel. In addition, it is noted that while the single-panel projection system according to embodiments of the present invention may obtain a similar light efficiency as a three-panel projection system, the unique implementation of embodiments of the present invention allows for a greatly minimized projection system compared to the three-panel projection system.

Since scrolling can be performed by continuously rotating the scrolling unit 20 in one direction without changing the rotation direction, continuity and consistency can be guaranteed. In addition, since scrolling can be performed using a single scrolling unit, the scrolling unit 20 can be easily synchronized with the operating frequency of the light valve 40.

For example, the number of cylinder lens cells 17, on the scrolling unit 20, can be controlled to synchronize the scrolling unit 20 with the operating frequency of the light valve 40. That is, if the operating frequency of the light valve 40 is high, more cylinder lens cells can be included to increase scrolling or cycling speed while keeping the rotation speed of the scrolling unit constant.

Alternatively, a scrolling unit can be synchronized with the operating frequency of the light value by maintaining the number of cylinder lens cells on the scrolling unit uniform and increasing the rotation frequency of the scrolling unit. For example, when the operating frequency of the light valve 40 is 960 Hz, that is, when the light valve 40 operates at 1/960 of a second per frame such that 960 frames are reproduced per second, a scrolling unit can be implemented as follows. If the scrolling unit 20 reproduces 32 frames per one rotation, it must rotate 30 times per second in order to reproduce 960 frames per second. At this speed, the scrolling unit 20 must rotate 1800 times for 60 seconds, and accordingly it has a rotation speed of 1800 rpm. When the operating frequency of the light value is increased by half and thus the light valve operates at 1440 Hz, a scrolling unit must rotate at a 2700 rpm speed in order to be synchronized with the increased operating frequency of the light valve.

Light emitted from the light source 10 is incident upon the scrolling unit 20 and is split into three beams, namely, R, G, and B beams, by the color separation hologram 23. Thereafter, the R, G, and B beams are incident upon the first fly-eye lens 25. Preferably, the first fly-eye lens 25 is located such as to face a focal plane of the scrolling unit 20. The R, G, and B beams transmitted by the first fly-eye lens 25 are focused on the second fly-eye lens 26 so that beams of the same color are collected together. Thereafter, the R, G, and B beams pass through the relay lens 30 and are focused on three respective color areas of the light valve 40, thereby resulting in the R, G, and B color bars being formed at the light valve 40.

As described above, the R, G, and B beams transmitted by the scrolling unit 20 are focused on their respective color areas of the light valve 40 via the first and second fly-eye lenses 25 and 26 and the lens array 30, thereby forming color bars. The first and second fly-eye lenses 25 and 26 are formed so that their lens cells match with color bar images formed by the scrolling unit 20 and the color separation hologram 23 in a one-to-one correspondence.

Figure 5:
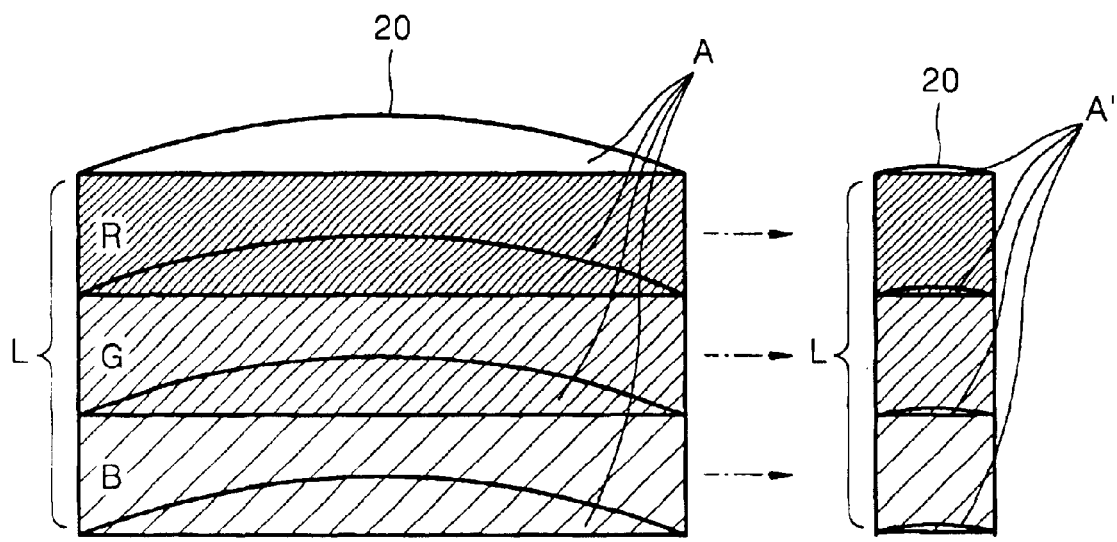
FIG. 5 illustrates a variation in a size of a beam incident upon a scrolling unit when a pair of cylinder lenses are not included in a projection system and when a pair of cylinder lenses are included in a projection system, according to embodiments of present invention.

In addition to the above-described structure, preferably, first and second cylinder lenses 15 and 24 are further provided along a light path between the light source 10 and the first and second fly-eye lenses 25 and 26. The first and second cylinder lenses 15 and 24 can control the width of a beam emitted from the light source 10. FIG. 5 illustrates a comparison between a beam that is emitted from the light source 10 and incident upon the scrolling unit 20, without passing through the first cylinder lens 15, and a beam that has a width reduced by the first cylinder lens 15 and then is incident upon the scrolling unit 20.

When a beam L passing through the scrolling unit 20 is relatively wide as shown in the left drawing of FIG. 5, the shape of the lens cell 17 does not match with that of the beam L due to the curvature of the scrolling unit 20, causing light loss of an unmatched area A for each color. To minimize the light loss, preferably, the first cylinder lens 18 is provided to reduce the width of the beam L so that the shape of the beam L matches with that of the lens cell 17 as much as possible. Hence, with an unmatched area, when the width of the beam L passing through the scrolling unit 20 is reduced, being referred here as A', A' is smaller than A. Consequently, light loss is reduced. Thereafter, a beam transmitted by the scrolling unit 20 is collimated by the second cylinder lens 24.

As described above, light loss can be reduced by controlling the width of a beam using the first and second cylinder lenses 15 and 24. Next, a beam transmitted by the first and second cylinder lenses 15 and 24 can be focused on the light valve 40 via the first and second fly-eye lenses 25 and 26 and the relay lens 30.

Figure 6A:
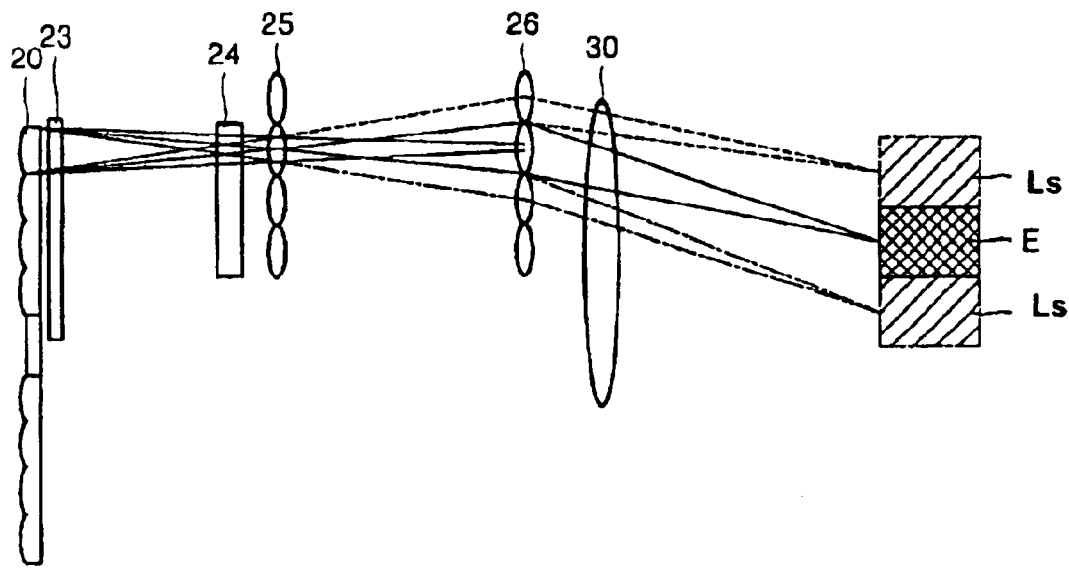
FIG. 6A illustrates a light path when a light path correction hologram is not included in a projection system, according to an embodiment of the present invention.

FIG. 6A illustrates a beam transmitted by the color separation hologram 23 being separated into three beams, namely, R, G, and B beams, with the R, G, and B beams being incident at different locations of the first fly-eye lens 25. Preferably, light transmitted by each of the lens cells of the first fly-eye lens 25 is incident upon a corresponding lens cell of the second fly-eye lens 25. However, because the incidence angle of light is changed while the light is passing through the color separation hologram 23, light transmitted by a lens cell of the first fly-eye lens 25 may not be exactly incident upon its corresponding lens cell of the second fly-eye lens 26, resulting in a leakage of light to adjacent lens cells. In FIG. 6A, a light path illustration has been somewhat exaggerated to show the light path of leaking light.

Figure 6B:
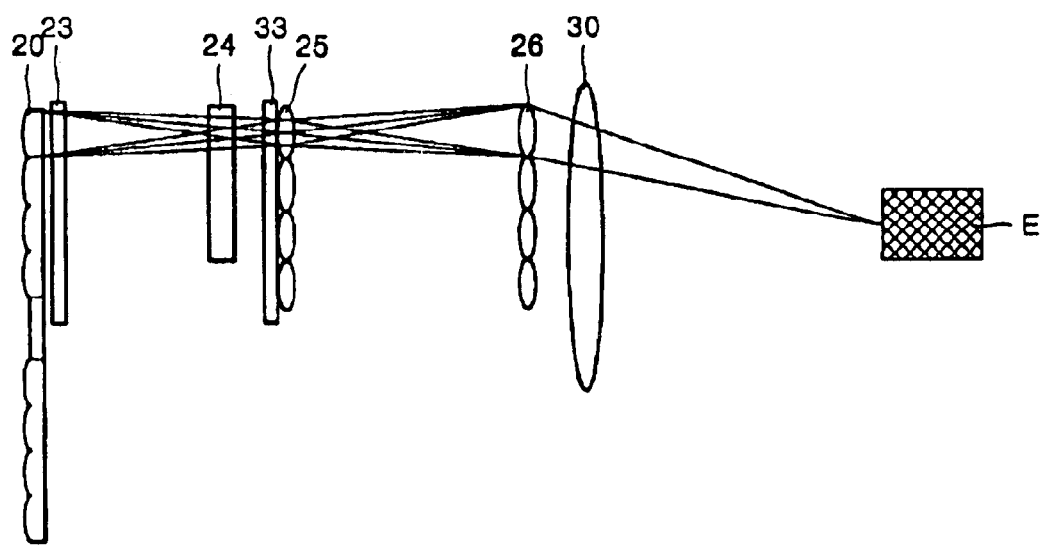
FIG. 6B illustrates a light path when a light path correction hologram is included in a projection system, according to an embodiment of the present invention.

Because the light path varies according to the incidence angle, only part of light transmitted by the color separation hologram 23 is effective light (E), while the rest is leaking light (Ls). Thus, light loss occurs. The light loss due to the generation of the leaking light (Ls) can be prevented by further including a light path correction hologram 33 corresponding to the color separation hologram 23, as shown in FIG. 6B. The light path correction hologram 33 restores the incidence angle changed by the color separation hologram 23 back to the original incidence angle so that the light transmitted by the first fly-eye lens 25 is exactly incident upon the second fly-eye lens 26 without light loss. Accordingly, leaking light can be minimized to prevent light loss.

As described above, a projection system according to the present invention easily performs color scrolling by using a scrolling unit and a color separation hologram, thus producing a color picture.

Because the adopted color separation hologram is at least both small and easily manufactured, the projection system according to embodiments of the present invention are smaller than conventional projection systems. Also, because a single scrolling unit performs color scrolling, the number of components can be minimized and color scrolling can be easily controlled. Thus, embodiments of the present invention result in a light, low-price, projection system.

Furthermore, since a conventional single-panel projection system is required to produce color images by sequentially separating white light into R, G, and B light beams, the efficiency of light valve usable light is degraded to ⅓ of the light efficiency of a three-panel projection system. However, in a single-panel projection system adopting a scrolling technique according to embodiments of the present invention, three color beams radiated from a light source can be scrolled simultaneously without a need to sequentially process each of the three color beams. Therefore, a single-panel projection system, according to embodiments of the present invention, can obtain the same light efficiency as a three-panel projection system.

While the present invention has been particularly shown and described with reference to preferred embodiments thereof, it will be understood by those of ordinary skill in the art that various changes in form and details may be made without departing from the spirit and scope of the present invention, as defined by the claims and their equivalents.

What is claimed is:

1. A projection system, comprising:
a light source;
a scrolling unit, including spirally arranged cylinder lens cells, to scroll an incident beam, from the light source, while rotating;
a color separation hologram to separate the incident beam into beams with different wavelengths;
a light valve to form a color image by turning on or off pixels according to an input image signal and color separated scrolling light beams; and
a projection lens unit to magnify the color image formed by the light valve and projecting the magnified color image toward a screen.

2. The projection system of claim 1, further comprising first and second fly-eye lenses between the light source and the light valve.

3. The projection system of claim 2, further comprising a relay lens between the second fly-eye lens and the light valve to focus color beams transmitted by the second fly-eye lens on respective color areas of the light valve.

4. The projection system of claim 3, further comprising a first cylinder lens before the scrolling unit and a second cylinder lens, paired with the first cylinder lens, after the scrolling unit to control a width of the incident beam.

5. The projection system of claim 3, further comprising a light path correction hologram to correct changes of light paths of color beams transmitted by the color separation hologram.

6. The projection system of claim 2, further comprising a first cylinder lens before the scrolling unit and a second cylinder lens, paired with the first cylinder lens, is installed after the scrolling unit to control a width of the incident beam.

7. The projection system of claim 2, further comprising a light path correction hologram to correct changes of light paths of color beams transmitted by the color separation hologram.

8. The projection system of claim 7, wherein the light path correction hologram prevents a light loss due to a generation of leaking light in the projection system.

9. The projection system of claim 1, wherein the scrolling unit comprises a disc comprising the spirally arranged cylinder lens cells.

10. The projection system of claim 1, wherein the projection system is a single-panel projection system.

11. The projection system of claim 1, wherein the scrolling unit and the light separation unit combine to scroll at least three separate color beans simultaneously.

12. The projection system of claim 1, wherein the arranged cylinder lens cells include a number of cylinder lens cells to synchronize the scrolling unit with an operating frequency of the light valve.

13. The projection system of claim 1, wherein a rotation frequency of the scrolling unit is controlled to synchronize the scrolling unit with an operating frequency of the light valve.

14. A projection system, comprising:
a light source;
a scrolling unit including spirally arranged cylinder lens cells;
a light valve forming a color image based on color separated scrolling light beams that are based at least on light beams from the light source scrolled by the scrolling unit; and
a projection unit to project the color image.

15. The projection system of claim 14, further comprising a color separation hologram separating a beam from the light source into beams with different wavelengths.

16. The projection system of claim 15, wherein the color separation hologram receives light beams scrolled by the scrolling unit.

17. A projection system, comprising:
a light source;
a scrolling unit to simultaneously scroll at least two incident light beams from the light source, wherein the scrolling unit comprises spirally arranged lenses to perform the simultaneous scrolling of the at least two incident light beams;
a light valve forming a color image based on color separated scrolling light beams that is based at least on one of the two scrolled light beams; and
a projection unit to project the color image.

18. The projection system of claim 17, further comprising a color separation hologram separating an incident beam from the light source into beams with different wavelengths.

19. The projection system of claim 18, wherein the incident beam separate by the color separation hologram is a beam scrolled by the scrolling unit.

20. The projection system of claim 17, wherein the scrolling unit comprises a disc comprising spirally arranged cylinder lens cells, as the spirally arranged lenses, to perform the simultaneously scrolling of the at least two incident light beams from the light source.

21. A image generation method, comprising:
simultaneously scrolling at least two incident light beams from a light source, wherein the simultaneous scrolling includes simultaneously scrolling using spirally arranged lenses for the simultaneous scrolling of the at least two incident light beams; and
generating a color image based on color separated scrolling light beams that are based at least on one of the two scrolled incident light beams.

22. The image generation method of claim 21, further comprising separating a beam from the light source into beams with different wavelengths.

23. The image generation method of claim 22, wherein the separated beam, separated by a color separation hologram, is a beam scrolled by the scrolling unit.

24. A projection method, comprising:
simultaneously scrolling at least two incident light beams from a light source, wherein the simultaneous scrolling includes simultaneously scrolling using spirally arranged lenses for the simultaneous scrolling of the at least two incident light beams;

generating a color image based on color separated scrolling light beams that are based at least on one of the two scrolled incident light beams; and projecting the generated color image.

25. The projection method of claim 24, further comprising separating a beam from the light source into beams with different wavelengths.

26. The projection method of claim 25, wherein the color separation hologram color separates light beams scrolled by the scrolling unit.

27. The projection method of claim 25, further comprising correcting changes of light paths of the beams with different wavelengths.

28. The projection method of claim 24, further comprising focusing color separated scrolling light beams to respective color areas of a light valve for the projecting of the generated color image.

29. The projection method of claim 28, further comprising controlling a width of a beam incident upon the scrolling unit.

* * * * *